UNITED STATES PATENT OFFICE.

ERNEST SOLVAY, OF BRUSSELS, BELGIUM, ASSIGNOR TO THE SOLVAY PROCESS COMPANY, OF SYRACUSE, NEW YORK.

APPARATUS FOR CAUSTICISING AMMONIA-LIQUOR.

SPECIFICATION forming part of Letters Patent No. 518,429, dated April 17, 1894.

Application filed December 7, 1889. Serial No. 332,924. (No model.) Patented in Belgium October 19, 1888, No. 83,661; in Germany November 4, 1888, No. 49,500; in France April 15, 1889, No. 197,483, and in England May 16, 1889, No. 8,169.

*To all whom it may concern:*

Be it known that I, ERNEST SOLVAY, a subject of the King of Belgium, residing at Brussels, Belgium, have invented a new and useful Apparatus for Distilling Ammonia, (for which I have obtained Letters Patent in the following countries, to wit: Belgium, No. 83,661, dated October 19, 1888; France, No. 197,483, dated April, 15, 1889; Germany, No. 49,500, dated November 4, 1888, and Great Britain, No. 8,169, dated May 16, 1889,) of which the following, taken in connection with the accompanying drawing, is a full, clear, and exact description.

My invention relates to improvements in an apparatus for distilling ammonia liquor, and has for its object the production of a simple and effective device, whereby the carbonic anhydride $CO_2$ and sulphureted hydrogen $H_2S$ are separated from the weak ammonia liquor before its passage to the still, and the distilled vapors are utilized to effect this separation of the said gases from the weak ammonia liquor; and to this end the invention consists, essentially, in a separator composed of a series of chambers; connected coiled pipes or flues in the separate chambers; a still connected to said pipes or flues for passing the distilled vapors therethrough, and raising the temperature of said chambers; a condenser and heater connected to said separator for condensing the vapors, and a receiver for the concentrated ammonia liquor.

The invention also consists in a washer containing weak ammonia liquor; a pipe opening from said washer for conducting the ammonia liquor into the inlet chamber of the separator; overflow pipes or passages between the various chambers of the separator, whereby the liquor is conducted from one to the other, thus constantly raising its temperature and effecting the cooling of the distilled vapors passing in the opposite direction through the pipes or flues in said separator; and a connection from the outlet chamber of said separator to the still.

The invention still furthermore consists in a gas outlet pipe or tube for one or more of the chambers of the separator extending into the next cooler chamber, in a cap placed over the outlet of said pipe or tube for compelling the gas to pass through the ammonia liquor in said cooler chamber in order to retain the ammonia $H_3N$ liberated in the previous chamber, and in a connection from said separator to the washer, whereby the liberated gas is passed through the comparatively cool ammonia liquor in the washer, thus positively preventing the escape of ammonia; and the invention still furthermore consists in the detail construction and arrangement of the parts, all as hereinafter more particularly described and pointed out in the claims.

In describing this invention, reference is had to the accompanying drawing, illustrating my apparatus, in elevation, and partly in section.

In this drawing —A— represents the still which is shown in elevation; —B— the separator; —D— a condenser and heater; —G— a tank or reservoir for the uncausticised ammonia liquor, and —F— the receiver for the distilled causticised liquor, all of which parts are shown in vertical section.

This apparatus is especially designed for use in carrying out my improved process as described and claimed in my application of even date herewith.

—A— represents the still which is of any suitable form, size and construction, and —a— represents an inlet pipe discharging into the still —A— the ammonia liquors which have been previously conducted from the tank or reservoir —G— through the condenser and heater —D— and the separator —B—. The distilled heated vapors are conducted from the still —A— by an outlet pipe —a′—, which discharges into the base of a separator or column —B—, which may also be of suitable form and construction and may be composed of any desirable material. This separator or column is composed of a series of distilling chambers —$b$—$b'$—$b^2$—$b^3$—$b^4$— preferably formed by division plates —$b^5$— provided in said column at various intervals. The ammonia vapors conducted from the still —A— by the pipe —$a'$— are conveyed through the various chambers of the separator by means of coiled pipes — $c$—$c'$ — $c^2$ — $c^3$ — $c^4$— arranged within said chambers of the which conducts the liberated gases $CO_2$ and $H_2S$ into the washer —H— and causes the same to pass through the comparatively cold ammonia liquor therein, during which washing the remaining traces of ammonia are absorbed by said cold liquor, whereupon the said gases are discharged by the pipe —4—. This manner of conducting the liberated gases absolutely prevents the escape of any ammonia together with the carbonic anhydride and sulphureted hydrogen, but if desired, the pipe —4— may discharge into an acid washer, which will further prevent the escape of ammonia.

The operation of my invention will be readily understood from the foregoing and it will be particularly noticed that before its passage to the still —A—, the ammonia liquor is deprived of its carbonic anhydride and sulphureted hydrogen without any liability of the escape of ammonia, and that thereby a highly concentrated ammonia liquor is produced, which is far greater in power than it has heretofore been possible to distill. It will also be noticed that a minimum amount of heat is required to effect this desirable result, since the outgoing distilled vapors are passed through pipes or tubes arranged within the chambers containing the incoming liquor to be distilled, thus depriving the vapors of heat and adding to the temperature of the liquor.

It is evident that instead of the separate coiled pipes or tubes other suitable passages or receptacles may be used and that other changes may be made in the relative construction and arrangement of the parts without departing from the spirit of my invention, hence I do not limit myself to the exact detail construction of my improved apparatus.

Having thus fully described my invention, what I claim as new, and desire to secure by Letters Patent, is—

1. The combination of a separator having an incoming liquor conduit and an outgoing vapor conduit, a condenser and heater having an incoming liquor conduit and an outgoing vapor conduit connected respectively to the incoming and outgoing conduits of the separator, a pipe leading from the separator for discharging the volatile gases, and a washer connected to the incoming liquor conduit of the separator and to the incoming liquor conduit of the condenser and heater and to the gas discharging pipe of the separator, substantially as and for the purpose specified.

2. The herein described apparatus, the same comprising a separator, provided with a series of connected liquor chambers of different temperatures for successively receiving the liquor conducted to the separator and gradually raising its temperature, a series of coiled vapor pipes within said chambers, elbows having enlargements and connecting said coils outside the separator, a still connected to the outlet liquid chamber of the separator for receiving the liquor therefrom, and to the coil in said chamber for discharging the distilled vapors thereinto, and condensation-conveying pipes connecting said enlargements with the still, substantially as and for the purpose set forth.

3. The herein described apparatus, the same comprising a separator provided with a series of connected chambers of different temperatures for successively receiving the liquor conducted to the separator and gradually raising its temperature, a series of connecting tubes between said chambers for discharging the gas liberated in the said chambers into the liquor in the chamber of next lower temperature, a series of coiled vapor pipes within said chambers, elbows connecting said coils outside the separator a still connected to the outlet liquor chamber of the separator for receiving the liquor therefrom and connected to the vapor coil in said chamber for discharging the distilled vapors thereinto, substantially as and for the purpose set forth.

4. The herein described apparatus, the same comprising a separator provided with a series of connected liquor chambers of different temperatures for successively receiving the liquor conducted to the separator and gradually raising its temperature, a series of connected coiled vapor pipes within said chambers, a still connected to the outlet liquor chamber of the separator for receiving the liquor therefrom and connected to the inlet vapor coil in said chamber for discharging the distilled vapors thereinto, a condenser and heater having a series of connected vapor chambers one of which is connected to the coiled pipes in the separator whereby the vapors are successively passed through said chambers of the condenser and heater, and a series of coiled liquor pipes or tubes in the chambers of the condenser and heater connected to the inlet liquor chamber of the separator for receiving the raw liquor, raising its temperature and discharging the same into the separator, substantially as and for the purpose specified.

5. The herein described apparatus, the same comprising a separator provided with a series of connected liquor chambers of different temperatures for successively receiving the liquor conducted to the separator and gradually raising its temperature, a series of connecting gas tubes between said chambers for discharging the gas liberated in the said chambers into the liquor in the chamber of next lower temperature, a series of connected coiled vapor pipes within said chambers, a still connected to the outlet liquor chamber of the separator for receiving the liquor therefrom and connected to the vapor pipe in said chamber for discharging the distilled vapors thereinto, a condenser and heater having a series of connected vapor chambers the outlet one of which is connected to the vapor coil in the inlet liquor chamber of the separator whereby the vapors are successively passed through said coils of the separator and chambers of the condenser and heater, and a series of coiled liquor pipes in the chambers of the condenser and heater connected to the inlet liquor chamber of the separator, for receiving the raw liquor, raising its temperature and discharging the same into the separator, substantially as and for the purpose set forth.

6. The combination of a washer, a separator having an incoming liquor conduit connected to the washer and having an outgoing vapor conduit, a condenser and heater having an incoming liquor conduit connected to the washer and having a vapor conduit connected to the outgoing vapor conduit of the separator, a pipe opening from the separator and discharging into the washer for conducting the volatile gases in the separator into the washer, a still connected to the incoming and outgoing conduits of the separator, and a receiver connected to the outgoing conduit of the condenser and heater, substantially as and for the purpose set forth.

7. The herein described apparatus, the same comprising a separator provided with a series of connected chambers of different temperatures, a series of connecting tubes between said chambers for discharging the gas liberated in the said chambers into the liquor in the chamber of next lower temperature, a series of connected pipes within said chambers, a condenser and heater having an incoming liquor conduit and having an outgoing vapor conduit connected to the pipe in the inlet liquor chamber of the separator, a still connected to the outlet liquor chamber of the separator for receiving the liquor therefrom and connected to the pipe in said chamber for discharging the distilled vapors thereinto, and a washer connected to the inlet liquor chamber of the separator and to the incoming vapor conduit of the condenser and heater, substantially as and for the purpose specified.

In testimony whereof I have hereunto signed my name, in the presence of two attesting witnesses, at the city of Brussels, Belgium, this 12th day of August, 1889.

ERNEST SOLVAY.

Witnesses:
ADOLF STEIN,
R. LUCON.

(No Model.)
M. SZUKALSKI.
MOWER ATTACHMENT.
No. 518,430. Patented Apr. 17, 1894.
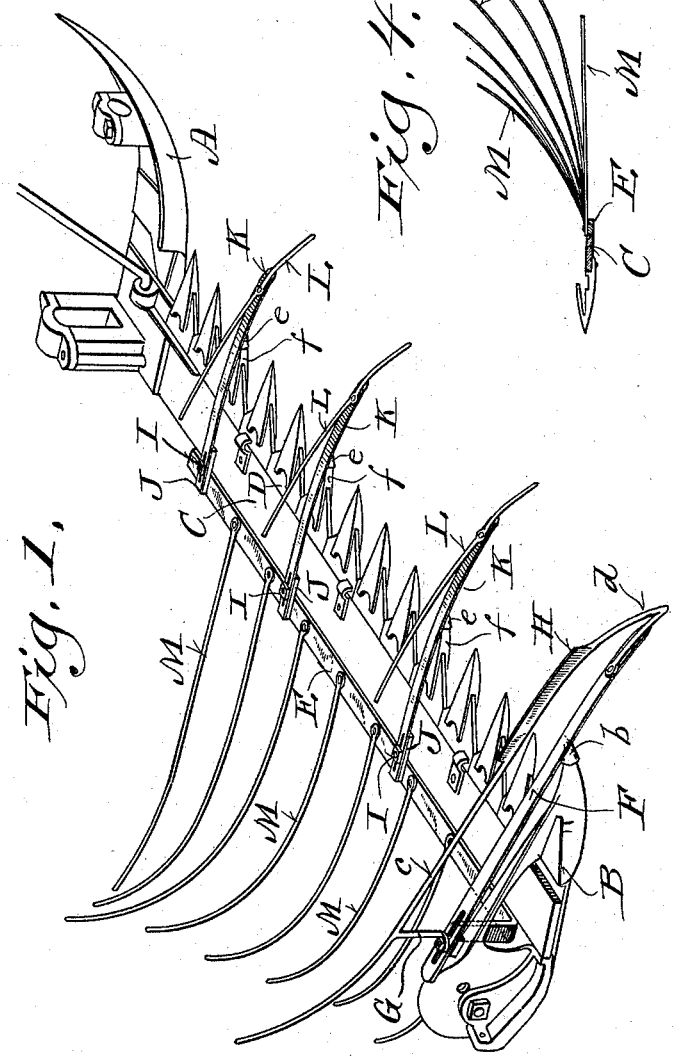
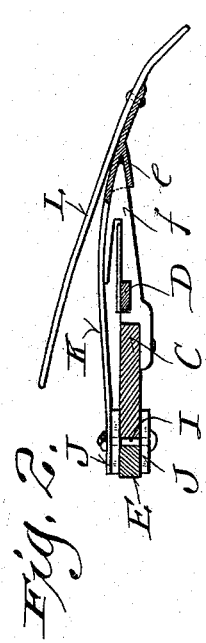
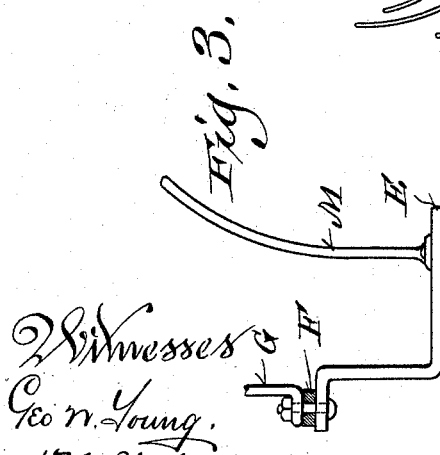
Witnesses
Geo. W. Young.
N. E. Oliphant
Inventor
Marian Szukalski
By H. G. Underwood.
Attorney